UNITED STATES PATENT OFFICE.

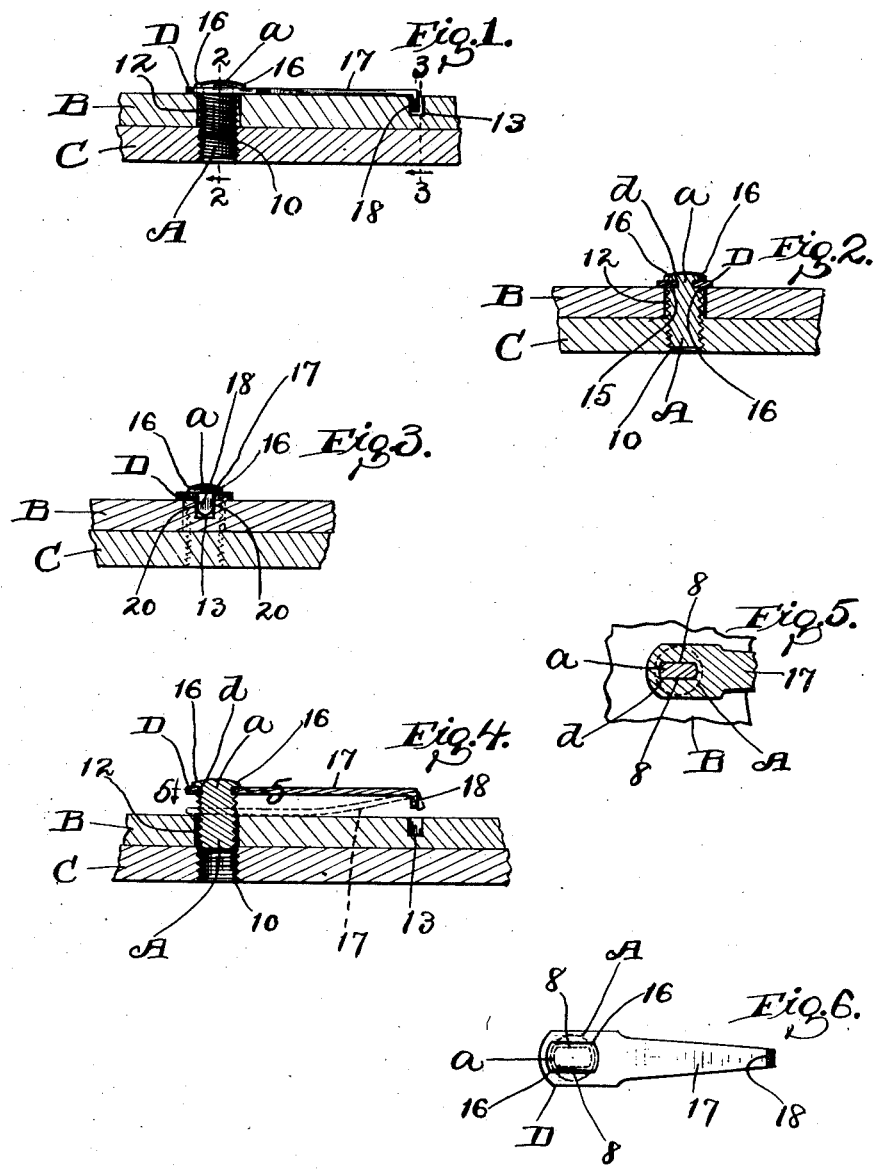

ISADOR LEHMAN, OF CLEVELAND, OHIO.

SCREW-LOCKING MEANS.

No. 826,584.	Specification of Letters Patent.	Patented July 24, 1906.

Application filed February 12, 1906. Serial No. 300,799.

*To all whom it may concern:*

Be it known that I, ISADOR LEHMAN, a citizen of the United States of America, residing at Cleveland, in the county of Cuyahoga and State of Ohio, have invented certain new and useful Improvements in Screw-Locking Means; and I hereby declare the following to be a full, clear, and exact description of the invention, such as will enable others skilled in the art which it pertains to make and use the same.

This invention relates to improvements in screw-locking means.

The object of this invention is to provide a screw at its outer end with a sheet-metal head which is fixed to the shank or body portion of the screw and is provided with a laterally-projecting crank-forming spring-arm integral with the said head, which arm is provided at its outer end with an inwardly-projecting member adapted to engage a hole or recess formed in the plate or object which is to be secured through the medium of the screw to another plate or object.

With this object in view this invention consists in certain peculiarities of construction and combinations of parts hereinafter described, and pointed out in the claims.

In the accompanying drawings, Figure 1 is a vertical section showing a plate or object secured to another plate or object by means of a screw embodying my invention. Fig. 2 is a vertical section on line 2 2, Fig. 1, looking in the direction indicated by the arrow. Fig. 3 is a vertical section on line 3 3, Fig. 1, looking in the direction indicated by the arrow. Fig. 4 is a vertical section through the plates illustrated in Fig. 1 with the screw in position to be screwed into the lower plate. Fig. 5 is a horizontal section on line 5 5, Fig. 4, looking downwardly. Fig. 6 is a top plan of my improved screw.

Referring to the drawings, A represents the screw-threaded portion of the shank of a screw adapted to secure a plate or object B to another plate or object C. Fig. 1 shows the screw screwed into a correspondingly-screw-threaded hole 10, formed in the plate C, and the screw extends loosely through a hole 12, formed in the plate B. The screw is provided at its outer end with a sheet-metal head D, and the shank terminates at the inner end of its screw-threaded portion A in a plain portion *a*, which has flat sides 8, as shown in Figs. 5 and 6, and is smaller in cross-section than the threaded portion A, so as to form an outwardly-facing shoulder or shoulders 15, against which the head D abuts. The screw is screwed into the plate C far enough to cause the head D to abut against the outer side of the plate B. The plain portion *a* of the shank is obviously angular in cross-section and snugly engages a correspondingly angular hole *d*, formed in the head D. The plain portion *a* of the shank extends through the head D and is upset at its outer end, as at 16, over the outer side of the head. It will be observed, therefore, that the sheet-metal piece which forms the head D is fixed to the shank of the screw.

The head D is provided with a laterally-projecting crank-forming spring-arm 17, employed in turning the screw in inserting the screw into or withdrawing it from the engaging screw-threaded hole. The arm 17 is provided at its outer end with an inwardly-projecting member 18 (shown in Fig. 1) engaging a recess or hole 13, formed in the outer side of the plate B a suitable distance from the hole 12. The upper portion of the member 18 (see Fig. 3) has its side edges 20 parallel or approximately parallel with the shank of the screw and snugly fits between correspondingly-parallel or approximately parallel side walls of the recess 13. It will be observed that the engagement of the member 18 with the hole 13 effectually locks the screw in place and that the said member 18 is not liable to be withdrawn from the said hole by vibration of the plates A and B.

The lower or free end of the member 18 is rounded, as shown in Fig. 3, to facilitate the entrance of the said member into the recess 13.

In solid lines, Fig. 4, the screw is shown extending through the hole 12 in the plate B and in position to be screwed into the hole 10 in the plate C. Obviously the springiness which the arm 17 possesses renders the outer end of the said arm capable of being lifted, as shown in dotted lines, as required during the turning of the screw in inserting the screw into the plate C, and after the screw is screwed into the plate C the said springiness causes the locking member 18 of the arm upon releasing the arm to spring into the recess or hole 13, and thereby lock the screw in place, as shown in Fig. 1.

The plain portion *a* of the shank of the screw is preferably somewhat larger in dimensions longitudinally of the sheet-metal piece which forms the head D and arm 17 than transversely of the said arm.

What I claim is—

1. The combination, with two plates or objects one whereof is to be secured to the other plate and provided at its outer side with a screw-receiving hole and a recess or hole which is arranged a suitable distance from the screw-receiving hole and adapted to receive a screw-locking member, of a screw having its shank extending loosely through the said screw-receiving hole and screwed into the last-mentioned plate, which shank is operatively provided, externally of the plate to be secured in place, with a spring-arm formed by a sheet-metal piece fixed to the shank and projecting laterally of the shank far enough to form a crank for turning the screw, and with the outer end of the arm provided with a locking member projecting into the aforesaid locking-member-receiving recess or hole.

2. The combination, with two plates or objects one whereof is to be secured to the other plate and provided at its outer side with a screw-receiving hole and a recess or hole which is arranged a suitable distance from the screw-receiving hole and adapted to receive a screw-locking member, of a screw having its shank extending loosely through the said screw-receiving hole and screwed into the last-mentioned plate, which shank is provided, externally of the plate to be secured in place, with a plain portion which has a flat side or sides and is smaller in cross-section than the threaded portion of the shank so as to form an outwardly-facing shoulder or shoulders at the outer extremity of the aforesaid screw-receiving hole, said screw having a sheet-metal head which snugly embraces the plain portion of the shank and abuts against the aforesaid shoulder or shoulders, which head is provided with a spring-arm projecting laterally of the shank far enough to form a crank for turning the screw, with the head and its arm formed of a single piece of sheet metal, and with the outer end of the arm provided with a locking member projecting into the aforesaid locking-member-receiving recess or hole, and the outer end of the plain portion of the shank being upset over the outer side of the head.

3. The combination, with two plates or objects one whereof is to be secured to the other plate and provided at its outer side with a screw-receiving hole and a recess or hole which is arranged a suitable distance from the screw-receiving hole and adapted to receive a screw-locking member, of a screw having its shank extending loosely through the said screw-receiving hole and screwed into the last-mentioned plate, which shank is operatively provided, externally of the plate to be secured in place, with a spring-arm formed by a sheet-metal piece fixed to the shank and projecting laterally of the shank far enough to form a crank for turning the screw, with the outer end of the arm provided with a locking member projecting into the aforesaid locking-member-receiving recess or hole, and with the said projecting member snugly fitting between opposite side walls of the last-mentioned recess or hole and rounded at its free end.

4. As a new article of manufacture, a screw having a shank which has a screw-threaded portion and a plain portion which is next adjacent to the threaded portion and has a flat side or sides and is smaller in cross-section than the threaded portion of the shank so as to form a shoulder or shoulders between the plain portion and the threaded portion, said screw having a sheet-metal head which snugly embraces the plain portion of the shank and abuts against the aforesaid shoulder or shoulders, which head is provided with a spring-arm projecting laterally of the shank far enough to form a crank for turning the screw, with the outer end of the arm provided with an inwardly-projecting locking member, and with the outer end of the plain portion of the shank upset over the outer side of the head.

In testimony whereof I sign the foregoing specification in the presence of two witnesses.

ISADOR LEHMAN.

Witnesses:
C. H. DORER,
B. C. BROWN.